UNITED STATES PATENT OFFICE.

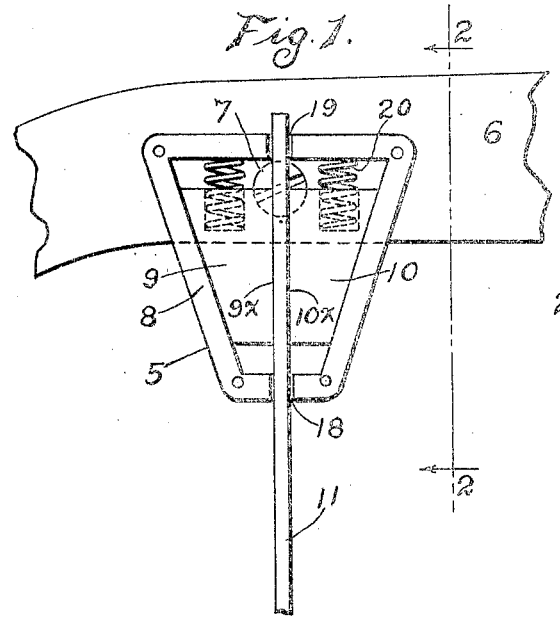
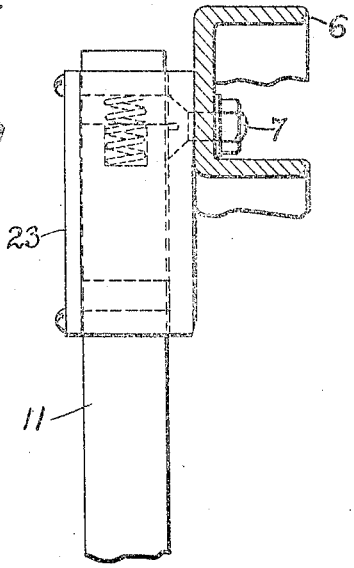
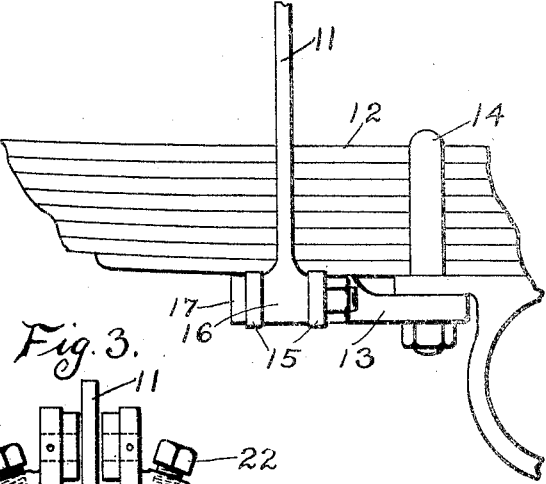
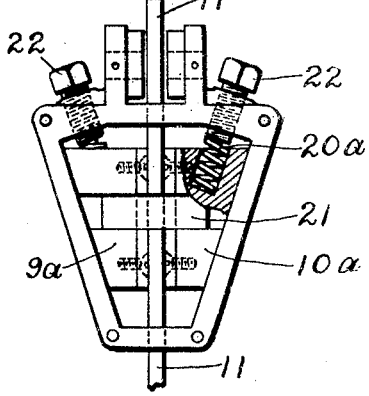

ALBERT S. KUX, OF CHICAGO, ILLINOIS.

SHOCK-ABSORBING DEVICE.

1,293,810. Specification of Letters Patent. Patented Feb. 11, 1919.

Application filed July 8, 1918. Serial No. 243,979.

*To all whom it may concern:*

Be it known that I, ALBERT S. KUX, a citizen of the United States, residing at Chicago, in the county of Cook and State of Illinois, have invented certain new and useful Improvements in Shock-Absorbing Devices, of which the following is a specification.

My invention relates to shock absorbing devices and refers particularly to such devices as are used on automobiles.

The present application is in part a division of an application filed by me on December 18, 1915, Serial Number 68,090, for shock absorbing devices and relates to a modification and improvement of the invention as therein disclosed.

I am aware that it is old and well known to employ shock-absorbing devices between two relatively movable parts of a vehicle (such as the body and axle, or other part of the running gear) so that the rebound of the vehicle springs from the shock is eased or given a braking effect by means of the shock-absorbing device. I am also aware that it is old to provide such devices in which the relative movement of the two parts or members is free and unobstructed in one direction, as, for example, when the two parts are moved toward each other, while it is retarded in the opposite direction, as the parts move away from each other. As used in the past, however, such devices have been complicated and cumbersome and impractical in actual use.

It is the object of my invention to produce a shock-absorbing device which will accomplish the results obtained by shock-absorbing devices of the prior art but by means of much simpler, more efficient, and more economical mechanism.

It is a further object of my invention to provide means for quickly and easily adjusting the retarding or braking action of the shock-absorbing device when the two relatively movable parts to which it is attached move in one direction with respect to each other, while no resistance is offered to the relative movement of these parts when they move in the opposite direction with respect to each other.

Stated in general terms, the mechanism used in connection with my invention consists of a brake member which is attached to one of the relatively movable parts of the vehicle, as, for example, the body thereof, and a strap member which engages the other relatively movable part of the vehicle, such as the axle, this strap member being preferably in the form of a flat rod (which may be corrugated if desired) engaged on its opposite faces by a pair of brake shoes which are preferably adjustable and are adapted to allow free movement of the strap member in one direction while retarding its movement in the opposite direction.

These and other advantages of my invention will be more readily apparent by reference to the accompanying drawings, in which—

Figure 1 is a side elevation showing my shock absorbing device as applied to a vehicle, the side cover of the brake-shoe casing being removed.

Fig. 2 is a sectional view on line 2—2 of Fig. 1.

Fig. 3 is an elevational view of a modification with the casing cover removed, and Fig. 4 is an end view of the device shown in Fig. 3.

As illustrated the casing 5 is in the form of a box preferably in the form of a trapezoid in outline with the parallel bases thereof as shown. The casing 5 is preferably secured to the frame member 6 of the vehicle by a bolt 7 or other suitable means. In the form shown in Fig. 1, the side portions 8 of the casing 5 are inclined so as to converge downwardly. Mounted to move within the casing 5 are wedges 9, 10, each having an outer face inclined to correspond to the adjacent wall member 8 of the casing, and each having a vertical face $9^x$ and $10^x$ for engaging a strap member 11 connected preferably to the springs of the vehicle and having an end extending through the casing 5.

The strap 11 is suitably secured to the spring 12 by a member 13 engaged by a suitable U-bolt 14 fastened to said spring, and which member 13 has a bifurcated end 15 for engaging the enlarged head 16 of the strap member, the head 16 being held in position therewith by a bolt 17.

As constructed the parallel faces of the casing 5 are provided with registering apertures 18, 19, through which the free end of the strap extends. In its passage through the casing the strap separates the wedges 9, 10. It will be observed that the wedges 9, 10, serve as brake-blocks to oppose the movement of the strap 11 when the members 6 and 12 have been brought together, which occurs whenever the vehicle hits a bump or the like. This action pushes the strap 11 upwardly through the casing 5 and because of the arrangement of the inclined walls 8 thereof and the wedges 9, 10, no resistance is offered by the blocks or wedges to the upward movement of the strap. However, on rebound, that is when the relatively movable members 6 and 12 separate, the strap 11 is pulled downwardly and the wedges 9, 10, tend to oppose such movement which tendency is created by the novel shape of the wedges engaging the inclined side walls of the casing 5 and at their rear portions 9 and 10, engaging each side of the strap 11. It would be possible to set up this clamping engagement by permitting the wedge blocks 9, 10, to act by gravity but oftentimes the rebound is so sudden that such action might be delayed to such an extent as to prevent benefit being derived from the shock absorbing features of the connections. To overcome this I provide springs 20 engaging the upper end of the blocks 9, 10 and tending to force same downwardly under normal conditions.

Such a device may be termed a "compensating absorber" in that the separation of the relatively movable members 6, 12, affects the pull of the strap 11 between the binding faces of the blocks 9 and 10. By reason of this the strap will pull the blocks 9, 10, downwardly tending to more firmly wedge same within the casing 8 and thus oppose movement of the strap 11 imposing a retarding effect thereon; the greater separation of the members 6 and 12, the greater will be the retarding effect on the strap 11.

In the modification shown in Figs. 3 and 4, I connect the blocks 9ª 10ª by an equalizer 21 so that simultaneous reciprocal movement of the blocks will be had at all times. This is desirable to create a uniform gripping on each side of the strap 11 and thus secure proper shock absorbing action without the likelihood that one of the blocks 9, 10, might be prevented from acting fully in performing its particular function. Such action might arise if one of the springs 20 were broken or weakened for some reason or if perchance dirt should gain access to the interior of the casing 5 and preclude proper action of either or both of the blocks 9, 10. The connection between the equalizer 21 and the blocks 9ª, 10ª is such as to permit the blocks to move upwardly and downwardly in the same manner as shown in Figs. 1 and 2, and also to move relatively toward and apart from each other. In this modification I have also provided a means for adjusting the tension of the springs so as to provide an adjustable shock absorbing device as it is desirable at times to compensate for the wear on the blocks 9ª, 10ª. The means which I provide include mounting springs 20ª at an angle to the vertical preferably with the axes thereof parallel to the adjacent wall, and holding the same in engagement with the blocks by means of set screws 22, which may be adjusted if desired by application of a wrench or similar tool. In both forms the casings are provided with covers 23 for excluding dirt and the like to the interior thereof and for maintaining lubricant if such is desired.

It will be apparent to those skilled in the art that the shock absorber of my invention will perform its functions under any and all conditions of service and that in the modified form shown in Figs. 3 and 4 a single type may be made applicable to vehicles of various weights while at the same time securing proper amount of shock absorbing action. It will also be apparent that my shock absorber is simple, economical and of such a nature that the wear and tear on a vehicle are greatly decreased and smoothness and comfort in riding increased.

It will be apparent to those skilled in the art that many changes could be made in the detailed construction of the various parts which I have described without departing from the spirit or scope of my invention, as defined in the appended claims.

I claim—

1. A shock absorbing device in combination, two relatively movable members, a casing attached to one of said members and having side walls converging downwardly, brake shoes within said casing having inclined faces to coöperate with the sides of said casing, a substantially flat strap attached to the other of said members and engaged on opposite sides by said brake shoes, and yielding means between said shoes and casing whereby said strap may be freely moved between said shoes when said members are relatively moved in one direction and the movement of said strap will be retarded when said members are relatively moved in the opposite direction.

2. In a device of the class described, the combination of two relatively movable members, a casing attached to one of said members having side walls converging downwardly, a substantially flat strap attached to the other of said members and entering said casing, wedge shaped brake shoes mounted within the casing and adapted to engage opposite sides of said strap and coöperate with the inclined side walls of the casing and means for maintaining said shoes in clamping engagement with said strap whereby the shoes are moved into wedging engagement with said strap when said members are relatively moved apart, and freed therefrom when the members are moved in the opposite direction.

3. A shock absorbing device in combination, two relatively movable members, a casing trapezoidal in outline and having registering apertures in the parallel sides thereof, said casing being secured to one of said members, a strap on the other movable member extending through said apertures and entering said casing through the shorter of the parallel sides, brake shoes within said casing having inclined faces to engage the inclined sides of said casing and substantially vertical faces to engage said strap, means to urge said shoes into braking engagement with said strap, and means for causing simultaneous movement of said shoes.

4. A shock absorbing device in combination, two relatively movable members, a casing trapezoidal in outline and having registering apertures in the parallel sides thereof, a strap on the other movable member extending through said apertures and entering said casing through the shorter of the parallel sides, brake shoes within said casing having inclined faces to engage the inclined sides of said casing and substantially vertical faces to engage said strap, means to urge said shoes into braking engagement with said strap, and means for varying the braking engagement between said shoes and said strap.

5. A shock absorbing device in combination, two relatively movable members, a casing trapezoidal in outline and having registering apertures in the parallel sides thereof, a strap on the other movable member extending through said apertures and entering said casing through the shorter of the parallel sides, brake shoes within said casing having inclined faces to engage the inclined sides of said casing and substantially vertical faces to engage said strap, means to urge said shoes into braking engagement with said strap, means for causing simultaneous movement of said shoes, and means for varying the braking engagement between said shoes and said strap.

Signed at Chicago, Illinois, this 28th day of June, 1918.

ALBERT S. KUX.